United States Patent Office

3,446,873
Patented May 27, 1969

3,446,873
PROCESS FOR MANUFACTURING DIENE GRAFT COPOLYMERS
Ichiro Saito, Kazuo Saito, and Takeshi Tanaka, Mishima-cho, Osaka, Japan, assignors to Kanegafuchi Chemical Industry Co., Ltd., Osaka, Japan, a corporation of Japan
No Drawing. Filed Apr. 28, 1965, Ser. No. 451,626
Claims priority, application Japan, July 28, 1964, 39/43,073
Int. Cl. C08f *15/40;* C08d *3/02*
U.S. Cl. 260—880                                    6 Claims

ABSTRACT OF THE DISCLOSURE

A process of manufacturing graft polymers comprising the steps of (A) coagulating synthetic diene rubber particles with a water soluble coagulant, and (B) polymerizing the rubber particles with a polymerizable ethylenically unsaturated monomer mixture while more than 90% of the rubber particles are less than 0.2 microns in diameter; the content of the monomer mixture being at least 0.1% water soluble, and the polymerizing being effected at a temperature ranging from 40° C. to 70° C., and for a period of time ranging from 2 hours to 10 hours, and while the rubber particles are coagulating and enlarging.

---

This invention relates to a process of manufacturing mono-olefine-rubber polymers having characteristics of rigidity, transparency and high impact resistance.

Mono-olefine polymers and/or polymerized rubbers or copolymers of these various advantageous, physical and chemical characteristics, such as uniformity of quality, ease of mass production, and relatively low cost and are in wide use where such characteristics are desired. Some of these compounds have some but not all of such properties as high rigidity, transparency and impact resistance. None of these compounds have all of the latter properties. For example, articles thermally formed from material containing predominantly mono-olefine polymers usually have high transparency but poor impact resistance. Articles containing predominantly rubber have high impact resistance and transparency but may not be of the desired rigidity.

There have been a number of attempts at eliminating the foregoing deficiencies and at the same time retaining the foregoing advantages by mixing or combining together the different polymers. These attempts have not been altogether successful. For example, the mono-olefine-rubber polymers or compounds (e.g. acrylo-nitrile-butadiene copolymer, styrene-butadiene copolymer, etc.) tend to have clear transparency but lack the desired impact resistance or they have high impact resistance but are poor in transparency. As another example, meth-acrylic acid ester-butadiene copolymer gives high transparency but lacks desired rigidity.

The known prior art materials do not have a combination of the advantageous characteristics of high transparency, rigidity and impact resistance. There is a definite need for a material having such a combination of properties.

Accordingly, an object of this invention is to fill this need by providing a process for manufacturing a mono-olefine-rubber polymer compound having such characteristics or properties.

The present invention comprises a specification of the particular ingredients and conditions for graft polymerizing of mono-olefine polymers and rubbers to obtain a material which has the foregoing advantageous qualities of high transparency, impact resistance, and rigidity. Synthetic rubber is coagulated with a water soluble coagulant. Before more than ten percent of the rubber particles are greater than $0.2\mu$ in diameter, the mixture is graft polymerized with a polymerizable ethylenically unsaturated monomer having at least 0.1 percent dissolved in the water of the polymerization system.

A more specific understanding of this invention can be obtained by considering the following examples and tables in connection with the description.

One of the raw materials or ingredients of the inventive process is rubber which is believed to impart high impact resistance to the inventive composition. The term rubber as used herein includes synthetic diene rubbers, for example, the polymer rubber of butadiene, isoprene, chloroprene, etc., respectively, used singly and the copolymers of conjugated dieolefines with mono-olefine monomers, for example, acrylo-nitrile-butadiene copolymer, styrene-butadiene copolymer, acrylonitrile-chloroprene copolymer and the like. The copolymers are not limited by the amount of conjugated dieolefine content. However, copolymers with less than a preponderant proportion of conjugated dieolefines may be beneficial. The mentioned copolymers may be employed either singly or in combination with each other.

The rubber is preferably in the form of aqueous dispersion to enable appropriate homogeneous and stable graft polymerization of the rubber with other mono-olefine monomers. The rubber is of particles containing 90 percent or more of $0.2\mu$ or less diameter to obtain the desired product. The reason for selecting rubber particles of 90 percent or more of $0.2\mu$ or less diameter will be explained hereinafter in greater detail.

Another ingredient to be used in the inventive process is a mixture of one or more polymerizable ethylenically unsaturated monomers, which, according to the inventive process, is graft polymerized with the rubber to form the inventive product. It has been found that for the best results the monomer should have at least 0.1 percent of their total amount dissolvable in the water of the polymerization system at the ordinary polymerization temperature (e.g. 40–70° C.), pressure (atmospheric) and for a suitable period of time (2 to 10 hours). Although the polymerizable ethylenically unsaturated monomers require a particular amount of water soluble monomers, the remainder may be water insoluble monomers without harmful effects. The water soluble monomer of this invention includes acrylonitrile, methyl methacrylate, ethyl methacrylate, methylacrylate, ethylacrylate, vinylacetate and the like. The water insoluble monomers may include, styrene, α-methyl styrene and the like. The polymerizable ethylenically unsaturated monomers may be used singly or in combination with each other.

It has been further discovered that a coagulating agent is necessary to coagulate or adhere the rubber preferably prior to and during the polymerization process. The coagulant is water soluble and may comprise various electrolytes—those compounds capable of forming such ions as $Na^+$, $K^+$, $Ca^{++}$, $Mg^{++}$, $Al^{+++}$, $NH_4^+$ and $H^+$, and such ions as $Cl^-$, $Br^-$, $SO_4^{--}$, $SO_3^{--}$, $SO_2^{--}$, $S_2O_3^{--}$, $NO_3^-$, $NO_2^-$, $PO_4^{---}$, $HPO_3^{--}$, $CO_3^{--}$, $CH_3COO^-$, $(COO)_2^{--}$, $(CH_2CHCOO)_n^-$, and $OH^-$. Examples of such electrolytes include, for example, sodium chloride, phosphoric acid, or various water-soluuble organic compounds, such as water soluble alcohols, ketones, esters, aldehydes, nitriles and acid amides. The coagulant may comprise any one or more of the foregoing compounds used singly or in combination.

To the aqueous dispersion of rubber the coagulant is first added to cause coagulation or growth of the rubber particles. In the next step before less than 90 percent of the rubber particles have increased in size to greater than 0.2μ in diameter, the graft polymerization process takes place. The polymerization involves the addition of the mixture of polymerizable ethylenically unsaturated monomers to the rubber mixed with coagulant. An ordinary known type of polymerization process is carried out at temperatures of about 40 to 70° C., atmospheric pressure, and for a duration of from 2 to 10 hours. In accordance with this invention, the polymerization must be started at a particular time—that is before the size of 90 percent of the rubber particles becomes greater than 0.2μ in diameter.

It has been found through a series of experiments that certain advantageous characteristics of polymerizable ethylenically unsaturated monomer-rubber polymers are dependent upon the factors above mentioned. For example, it was found that the transparency of the intended product depends, inter alia, on the size of the rubber particle at the start of the graft polymerization of the monomer and the rubber. The degree of transparency of the intended product is approximately inversely proportional to the particle size of the rubber at the start of the polymerization step of the inventive process. The practical upper limit of particle size at the start of polymerization was found to be about when 90 percent or more of the particles are 0.2μ or less in diameter. There appears to be no lower limit, except, of course, that placed by operating conditions.

One experiment was carried out to determine the relationship between particle size and the various characteristics of the end product and is illustrated in Table 1.

TABLE 1.—EFFECT OF PARTICLE SIZE ON CHARACTERISTICS

| Characteristics | This invention 99% of less than 0.2μ | Contrast 94% of more than 0.2μ |
|---|---|---|
| Impact resistance, kg. cm./cm.² | 22.1 | 19.1 |
| Tensile strength, kg./cm.² | 419 | 310 |
| Elongation, percent | 13.0 | 26.0 |
| Transparency by eye observation | (¹) | (²) |
| Coefficient of transmission of visible light, percent | 80.0 | 40.0 |
| Haze value, percent | 5.1 | 28.0 |

¹ Transparent.
² Opaque.

The particle size of the latex was determined by one of the following methods (1) fractional creaming with sodium alginate. This method is described in "Rubber Age," vol. 88, 1960, p. 484 and (2) electron microscope measurement. This method is described in "Journal of Applied Physics," vol. 18, 1947, p. 273.

The values given in Table 1 are from samples obtained by polymerization, in the presence of 1.5 parts of sodium sulphate anhydride as a coagulant, of a monomer mixture consisting of 25 parts of acrylonitrile and 50 parts of styrene and 25 parts of a rubber latex (concentration 25 percent, gel percent 0) consisting of 76.5 percent butadiene and 23.5 percent styrene. The particle size of the rubber particles was varied for the different samples and ranged from 99 percent of less than 0.2μ diameter to 94 percent of more than 0.2μ in diameter.

In this and the following experiments reported in Tables 1–5, the impact resistance was measured in accordance with ASTM–D256–56. The tensile strength and elongation were measured in accordance with ASTM–D638–60T. The transparency was measured in accordance with the JIS–K–6714 standard. The haze value, in percent, was calculated in accordance with the formula:

$$\frac{\text{Scattering light}}{\text{Transmitted light}} \times 100$$

Another necessary element of the invention is the use of a coagulant in the polymerization system. It is not entirely clear why the transparency, and the impact resistance of the end product are improved by the coagulant. However, as one possible explanation, these effects may be due to the fact that rubber particles are used having sizes of 0.2μ in diameter which is less than the wavelength of visible light (which are 0.3–0.8μ). Moreover, homogeneous mixtures of monomers and rubber are graft polymerized concurrently with the coagulating action. Thus, the polymer product formed thereby have constituent elements of sizes less than the length of visible light. Accordingly, the end product is optically homogeneous and the coagulated or grown particles afford better dynamic absorption of impact energy. This effect of the coagulant can be more readily understood with reference to Table 2.

TABLE 2.—EFFECT OF COAGULANT ON CHARACTERISTICS

| Characteristics | This invention—Coagulant used | Contrast—Coagulant not used |
|---|---|---|
| Impact resistance, kg. cm./cm.² | 18.7 | 2.0 |
| Tensile strength, kg./cm.² | 406 | 414 |
| Elongation, percent | 20.0 | 17.0 |
| Transparency by eye observation | (¹) | (¹) |
| Coefficient of transmission of visible light, percent | 81.0 | 80.0 |
| Haze value, percent | 6.0 | 4.0 |
| The amount of graft polymer with less than 0.2μ particle diameter at the completion of polymerization | 18.0 | 72.0 |

¹ Transparent.

The values given in Table 2 were obtained with the samples produced using about the same ingredients and polymerization conditions as for the experiment reported in Table 1. The particle size of the rubber particles was kept constant for the different samples at 99 percent of less than 0.2μ diameter rubber particles. The amount of coagulant was, however, varied for the different samples. In one experiment coagulant was used, and its results were compared with the results of another experiment not using any coagulant.

Another important element of the invention is the requirement for a partially water-soluble polymerizable ethylenically unsaturated monomer. The monomers must have more than 0.1 percent dissolvable in the water of the polymerization system. One advantage to using water soluble monomers is that coagulation of the rubber polymer is promoted and hence coagulation improved. Moreover, the stability of the latex is preserved. On the other hand, with water insoluble monomers alone, the effect of the coagulant would be impeded thereby lessening the impact resistance of the end polymer product as can be seen more readily with reference to Table 3.

TABLE 3.—EFFECT OF TYPE OF MONOMERS ON CHARACTERISTICS

| Characteristics | This invention—Water soluble | Contrast—Water insoluble |
|---|---|---|
| Impact resistance, kg. cm./cm.² | 17.8 | 6.0 |
| Tensile strength, kg./cm.² | 483 | 420 |
| Elongation, percent | 20.0 | 13.0 |
| Transparency by eye observation | (¹) | (¹) |
| Coefficient of transmission of visible light, percent | 75.0 | 52.0 |
| Haze value | 6.0 | 18.0 |

¹ Transparent.

The values shown in Table 3 were obtained from a sample produced using about the same ingredients and operating conditions outlined for the experiment reported in Table 1, except the 75 parts of monomer mixture comprised a suitable proportion of water soluble monomer methyl methacrylate and water insoluble monomer styrene. In one experiment the suitable amount of water soluble monomer was used. In another experiment no water soluble monomer was used. The amount of rubber particles of 0.2μ or less diameters was kept constant.

An important part of the invention is the requirement for starting the graft polymerization process at a particular time. It is preferable that the polymerization begin while 90 percent or more of the rubber particles are 0.2μ in diameter or less. This may be prior to the coagulation step or during the coagulation step. If it is found that just 90 percent of the rubber particles are less than 0.2μ in diameter before the coagulation, the coagulation and polymerization steps should take place simultaneously. If, however, much more than 90 percent of the particles are less than 0.2μ, the coagulation step may begin before the polymerization step. As can be readily seen from the following Table 4, if the starting of the polymerization step is delayed until the rubber particles are above the aforementioned value, the desired end product cannot be readily obtained.

TABLE 4.—EFFECT OF TIMING OF STARTING POLYMERIZATION ON CHARACTERISTICS

| Characteristics | Starting of polymerization | |
|---|---|---|
| | This invention, when 99% of particles less than 0.2μ | Contrasts, when 25% of particles less than 0.2μ |
| Impact resistance, kg. cm./cm.$^2$ | 16.4 | 14.3 |
| Tensile strength, kg./cm.$^2$ | 414 | 391 |
| Elongation, percent | 17.0 | 26.0 |
| Transparency by eye observation | (¹) | (²) |
| Coefficient of transmission of visible light, percent | 80.0 | 35.0 |
| Haze value, percent | 4.0 | 25.0 |

¹ Transparent.
² Opaque.

The values reported in Table 4 were taken from a sample obtained by graft polymerization using ingredients and operating conditions similar to those for the experiment reported in Table 1, except the timing of the start of polymerization was varied to obtain the comparison values.

The following specific embodiment is given as being illustrative of the process of this invention.

EXAMPLE 1

A graft polymer was obtained using polymers of 25 percent concentration, containing about 99 percent of 0.2μ or less diameter particles of rubber and latex consisting of 76.5 percent butadiene and 23.5 percent styrene. The polymerization was carried out under the conditions and prescriptions indicated below.

| | | |
|---|---|---|
| Latex | parts | 100 |
| Solid | do | 25 |
| Water | do | 200 |
| Acrylonitrile | do | 25 |
| Styrene | do | 50 |
| Sodium sulphate anhydride | do | 1.5 |
| Cumene hydroperoxide | do | 0.4 |
| Ferrous sulphate heptahydrate | do | 0.0025 |
| Dextrose | do | 0.5 |
| Tertiary dodecyl mercaptan | do | 0.8 |
| Temperature | ° C. | 60 |
| Time | hours | 4 |

The graft polymer according to this process was roll-kneaded at 160° C. for ten minutes, then pressed at 190° C. for thirty minutes yielding a sample which was subsequently tested.

The results of the testing of this sample are given in Table 5.

Table 5.—Test results of sample

| | |
|---|---|
| Impact resistance (kg. cm./cm.$^2$) | 18.7 |
| Tensile strength (kg./cm.$^2$) | 406 |
| Elongation (percent) | 20.0 |
| Hardness (R) ¹ | 93.0 |
| Specific gravity | 1.04 |
| Transparency by eye observation | Transparent |
| Coefficient of transmission of visible light (percent) | 75.0 |
| Haze value (percent) | 6.0 |

¹ The hardness value was taken in accordance with ASTM D785-60T.

Various modifications and extensions of this invention will become apparent to those skilled in the art. All such variations and deviations which basically rely on the teachings, through which this invention has advanced the art, are properly considered within the spirit and scope of this invention.

What is claimed is:

1. A process of manufacturing graft polymers comprising the steps of:
    (A) coagulating synthetic diene rubber particles with a water soluble coagulant, and
    (B) polymerizing said rubber particles with a polymerizable ethylenically unsaturated monomer mixture while more than 90% of the said rubber particles are less than 0.2 microns in diameter, the contents of said monomer mixture being at least 0.1% water soluble, said polymerizing being carried out at a temperature within the range of from 40° C. to 70° C., for a period of time within the range of from 2 hours to 10 hours, and while said rubber particles are coagulating and enlarging.

2. The process according to claim 1, wherein said synthetic diene rubber particles are of butadiene and styrene, and said ethylenically unsaturated monomer mixture comprises acrylonitrile and styrene.

3. The process according to claim 1, wherein said synthetic diene rubber particles are of rubber selected from the group consisting of homopolymers of butadiene, isoprene, chloroprene and copolymers of acrylonitrile-butadiene, acrylonitrile-chloroprene.

4. The process according to claim 2, wherein said ethylenically unsaturated monomer mixture comprises methyl methacrylate and styrene.

5. The process according to claim 1, wherein said coagulant is an inorganic compound electrolyte.

6. The process according to claim 5, wherein said coagulant comprises sodium sulfate anhydrous.

References Cited

UNITED STATES PATENTS

| | | | |
|---|---|---|---|
| 3,370,105 | 2/1968 | De Bell et al. | 260—880 |
| 3,170,964 | 2/1965 | Grabowski | 260—879 |
| 3,213,159 | 10/1965 | Adomaitis | 260—880 |
| 3,300,545 | 1/1967 | Baer et al. | 260—876 |

MURRAY TILLMAN, *Primary Examiner.*

C. J. SECCURO, *Assistant Examiner.*

U.S. Cl. X.R.

260—29.7, 879